Jan. 10, 1950      J. E. KEISTER      2,494,339
NOISE-REDUCING PULSE-ECHO LOCATING EQUIPMENT
Filed July 21, 1943

Inventor:
James E. Keister,
by Harry E. Dunham
His Attorney.

Patented Jan. 10, 1950

2,494,339

UNITED STATES PATENT OFFICE 2,494,339

NOISE-REDUCING PULSE-ECHO LOCATING EQUIPMENT

James E. Keister, Scotia, N. Y., assignor to General Electric Company, a corporation of New York Application July 21, 1943, Serial No. 495,587

5 Claims. (Cl. 343—13)

The present invention relates to radio locating equipment of the type in which information is obtained by echoes or reflections of pulses of radio waves from remote objects.

Since the echoes are mixed with noise voltages, which at the maximum range of the equipment may be equal to or greater than the echo voltage, it is difficult to distinguish the weak echoes from unknown objects although once the object is located, it may be possible to distinguish the echoes from that object at much greater distances. For example, the point at which an approaching unknown aircraft can be located by its echoes would ordinarily be much nearer the equipment than the point to which a known aircraft could be followed if it were going away from the equipment.

It is a main object of my invention to provide an improved pulse-echo locating system in which a received echo signal accompanied by noise may readily be distinguished from noise alone.

More specifically, it is an object of my invention to provide an improved noise-reducing pulse-echo locating equipment in which an echo signal and noise are received during one gate interval and balanced against noise alone received during a different gate interval, thereby to minimize the effect of the noise.

Figure 1:
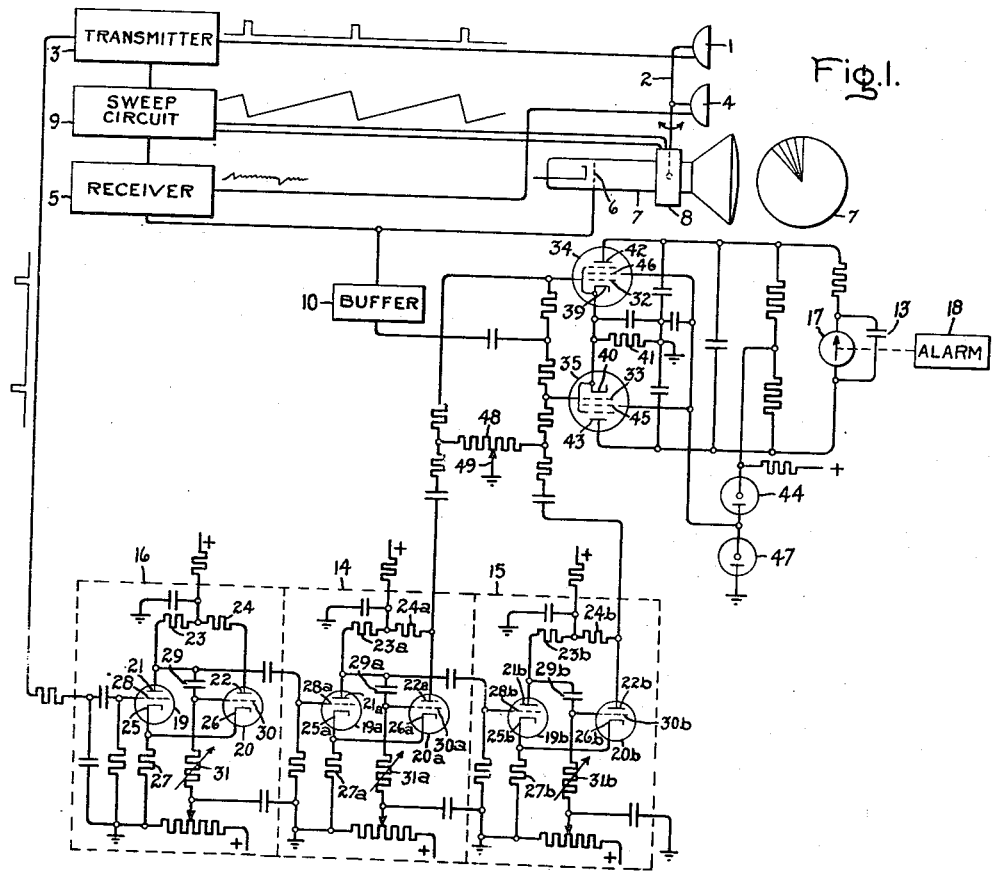
Figure 2:
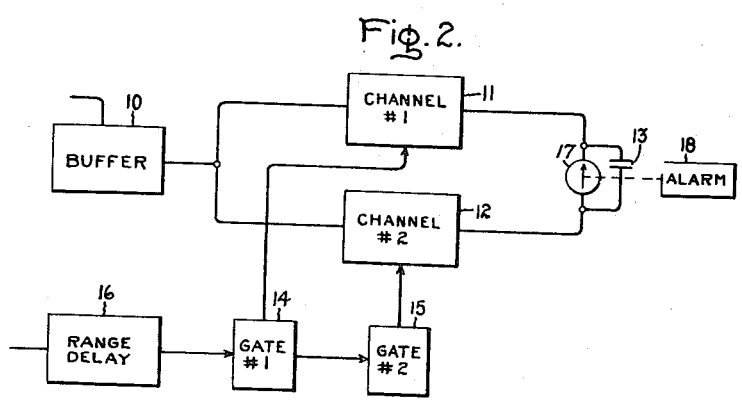

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a diagram of locating equipment embodying my invention and Fig. 2 is a block diagram of the equipment for indicating the presence of remote objects.

Referring to the drawing, there is shown locating equipment having a directional antenna system 1 mounted on a shaft 2 and connected to a pulse transmitter 3 which supplies pulses of radio waves at the desired repetition rate. The shaft 2 may be rotated, either back and forth or continuously, so the pulses radiated by the antenna scan the desired field. During the intervals between the transmitted pulses, echoes or reflections from remote objects are picked up by an antenna system 4, also mounted on the shaft 2, and fed through a receiver 5 to the grid 6 of a cathode ray tube 7 to modulate the beam of the cathode ray tube. The beam of the cathode ray tube is deflected radially from the center by a coil 8 connected to rotate with the shaft 2 so its deflecting axis corresponds to the directive axis of the transmitting antenna 2. The coil 8 is energized from a sweep circuit 9 keyed by the transmitter so as to supply a saw-tooth current starting at zero at the end of each transmitted pulse and increasing to a maximum just before the beginning of a succeeding pulse. Since the deflection of the beam is proportional to the sweep current, there appears on the viewing screen of the cathode ray tube a succession of radial traces starting at the center of the screen, representing the position of the equipment, and modulated by echoes at radial distances representing the positions of remote objects.

In addition to the reflections or echoes from remote objects, there are noise voltages which at the maximum range of the equipment may be of the same order of magnitude as the echoes. It is therefore difficult to locate an unknown object at the maximum range of the equipment through the masking noise voltages or from another aspect it is difficult to detect the approach of an object to within range of the equipment. Due to the random nature of noise voltages, as distinguished from the regular recurrence of echoes, it is easier to follow an object than to locate it. A warning of the approach of an object would facilitate its location.

In the present construction, a warning of the approach of an object within the range of the equipment is obtained (as indicated generally in Fig. 2) by feeding the output of the receiver 5 through a buffer amplifier 10 and sequentially through channels 11 and 12 connected in opposition to a condenser 13. The channels 11 and 12 are respectively controlled by gates 14 and 15 which sequentially turn the respective channels on for equal intervals corresponding to the range at which warning is desired of the approach of an object. The gate 15 is turned on by the gate 14 and the gate 14 is turned on by a range delay 16 which determines the warning range. The gate 15 is turned off before the transmission of a succeeding pulse. Since the channels are connected in opposition, the voltage on the condenser is proportional to the difference between the channel outputs. Noise voltages, which are of a random nature, tend to occur equally in each channel output and therefore produce no net voltage on the condenser 13. The gates have a width selected in accordance with the scanning speed and pulse rate of the transmitter and the maximum expected speed of travel of an approaching object so that a plurality of echoes will occur during one gate, i. e., an object traversing the region corresponding to one of the gates 14, 15 will reflect a plurality of the successive transmitted pulses. The net voltage on the condenser 13 will therefore be due to echoes. The condenser voltage can be measured by a voltmeter 17 which may be associated with an alarm to give a warning. The charging of the condenser 13 by the unbalance of the channel outputs has an integrating effect which tends to average the random noise voltages so a warning can be obtained through noise voltages of the same or greater magnitude than the echoes.

Once the operator of the equipment has received a warning of the approach of an object, the scanning of the transmitting antenna 1 can be directed to the region in which the antenna was directed at the time of the warning, the direction of the remote object can be determined by moving the antenna back and forth to obtain a maximum indication on the voltmeter 17, and the range of the object can be determined by varying the range delay 16 and noting the change in sign of the condenser voltage as the echoes are bracketed first by one and then by the other of the gates.

In Fig. 1, the range delay 16 and the gates 14 and 15 are shown as identical multivibrators of which only the range delay will be described in detail. It comprises discharge devices 19 and 20 having anodes 21 and 22 connected to a power supply through resistances 23 and 24 and having cathodes 25 and 26 connected to ground through a common cathode resistor 27. The device 20 is normally conducting and the current through the cathode resistor 27 biases the device 19 to cut-off. Coincident with the transmitted pulses, positive pulses are applied to the grid 28 of the device 19 causing it to conduct. The drop in voltage at the anode 21 is applied through a condenser 29 to the grid 30 of the device 20, biasing it to cut-off for an interval (the range delay interval) determined by the time required for the condenser 29 to discharge through a variable resistance 31. The device 19 continues to conduct throughout this interval. When the condenser 29 discharges, the device 20 again becomes conductive, causing a flow of current through the cathode resistor 27, biasing the device 19 off, and causing a sudden rise of the potential at the anode 21. This terminates the operation of the range delay multivibrator until the next succeeding transmitted pulse when the described cycle is repeated.

The gates 14 and 15 are identical multivibrators having parts indicated by the same reference numerals as the range delay 19 with subscripts a and b respectively. The gate 14 is fired by the rise in potential of the anode 21 at the end of the range delay (applied to the grid 28a) and the gate 15 is fired by the rise in potential of the anode 21a at the end of the gate 14 (applied to the grid 28b). The firing of the multivibrators results in the sequential appearance of positive pulse voltage at the anodes 22, 22a, and 22b having a duration determined by the adjustment of variable resistances 31, 31a, and 31b.

The pulse voltages at the anodes 22a and 22b are respectively applied to grids 32 and 33 of push-pull connected discharge devices 34 and 35 causing a current flow dependent upon the received signal voltage which is also applied to the grids 32 and 33 through the buffer 10. Applying the signal and gate voltages to the grids 32 and 33 improves the operation. The current flow through the device 34 causes the charging of the condenser 13 in one direction and the current flow through the device 35 causes the charging of the condenser 13 in the opposite direction. If the signals during the gates 14 and 15 are equal, as would be the case (on the average) if no echo were received, there would be no net charge on the condenser 13. When either the gate 14 or the gate 15 brackets an echo, a positive or negative charge accumulates on the condenser 13 which is proportional to the integrated echo voltages. The voltage on the condenser 13 is measured by the voltmeter 17 connected to the alarm 18 to give a warning that an unknown object has been bracketed by one of the gates 14 or 15. This warning may be obtained through masking noise voltages of greater intensity than the echoes.

Because the early warning is obtained by balancing the signals during different intervals, it is important that no unbalance be introduced by the circuit. The gates 14 and 15 are of identical construction and are adjusted to provide pulse voltages of equal magnitude and duration. The push-pull amplifier devices 34 and 35 are identical and are connected in a balanced circuit, the cathodes 39 and 40 being connected to ground through a common cathode resistor 41, the anodes 42 and 43 being energized from voltage regulator tube 44 and the screen grids 45 and 46 being energized from a voltage regulator tube 47. Despite these precautions there may be some unbalance which would cause a false indication. The final adjustment to remove the remaining unbalance consists of a resistance 48 connected across the outputs of the gates 14 and 15 and having an adjustable slider 49 connected to ground. The adjustment of the slider 49 varies the proportion of the gate voltages applied to the grids 32 and 33. Under conditions when no echo is received, the slider 49 is adjusted so there is no voltage across the condenser 13. With this adjustment, no alarm is given unless an echo is bracketed by one of the gates.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In echo type radio locating equipment having a transmitter for transmitting periodic directional pulses of radio waves scanning an area in which remote objects are expected, a receiver for echoes from said transmitted pulses having a pair of receiving channels, means for keying the channels on for two successive time intervals after the transmitted pulses related to the time of travel of the waves so as to correspond to regions at different distances from the equipment, the width of said intervals being coordinated with the scanning speed and pulse rate of the transmitter and the maximum speed of travel of remote objects so that an unknown object traversing said regions produces a plurality of successive echoes in one of said intervals while noise alone is received in the other of said intervals, means for integrating the signals for the respective channels during said intervals, and means responsive to the difference between the integrated signals and integrated noise for indicating the presence of an object in the corresponding one of said regions.

2. In echo type radio locating equipment having a transmitter for transmitting periodic directional pulses of radio waves scanning an area in which remote objects are expected, an early warning system for indicating the approach of remote objects comprising a receiver operative during two equal successive time intervals after the transmitted pulses, one of which is timed with reference to the time of travel of the waves to correspond to a region at a predetermined range and of such width that an object traversing the region during said time interval will reflect a plurality of the transmitted pulses and the other of which corresponds to a different non-overlapping region, means for balancing the receiver output during said intervals under conditions in which there is no reflected signal, and means responsive to the integrated difference between the receiver output during said intervals when echoes are received in said one interval for indicating the presence of a remote object in said one region.

3. In radio locating equipment having a transmitter for transmitting periodic directional pulses of radio waves scanning an area in which remote objects are expected, and a receiver for echoes of the transmitted pulses from remote objects, the arrangement for indicating the approach of objects to a region at such a range that noise voltages interfere with reception which comprises means for turning the receiver on for two successive time intervals after the transmitted pulses related to the time of travel of the waves so as to correspond to said range, said intervals being of such width that an object traversing one of said regions during the corresponding one of said time intervals will reflect a plurality of said transmitted pulses, and means for utilizing unbalance of the signal due to an echo plus noise voltage during one of said intervals as compared to the signal due to noise voltages alone during the other of said intervals to indicate the presence of an object.

4. In radio locating equipment having a transmitter for transmitting periodic directional pulses of radio waves scanning an area in which remote objects are expected, and a receiver for echoes of the transmitted pulses from remote objects, a system for warning of the approach of remote objects comprising push-pull connected devices having anodes connected in opposition and grids connected to the receiver output, means for applying gate voltages alternately to said grids poled to render said devices operative, said gate voltages having duration short relative to the time between transmitted pulses, and means for integrating the difference of said anode voltages to obtain a net voltage predominantly proportional to echoes bracketed by one or the other of said gates.

5. In a pulse echo system, means to transmit periodic pulses, a receiver for echoes corresponding to said pulses, means to indicate the received echoes in space sequence corresponding to the time sequence in which said echoes are received, said last means operating to indicate undesired noise currents thereby undesirably obscuring said echo indications, and additional means to warn of the receipt of echoes the indication of which may be obscured by said noise indication, said additional means being operative over two intervals in succession so spaced in time after each transmitted pulse as to receive echoes thereof during one of said intervals and to receive undesired noise voltage alone during the other of said intervals, means to integrate the noise and echo voltages received over said respective intervals, and means responsive to the difference in the integrals produced by said last means during said two intervals to warn of an echo from a remote object, the duration of said intervals being sufficiently great and so related to the maximum speed of objects from which echoes are to be received that said object in traversing the distance over which echoes are received reflects a plurality of said pulses and sufficient to produce a warning by said warning means.

JAMES E. KEISTER.

REFERENCES CITED

The following references are of record in the file of this patent:

UNITED STATES PATENTS

| Number | Name | Date |
|---|---|---|
| 2,208,349 | Ulbricht | July 16, 1940 |
| 2,220,183 | Ulbricht | Nov. 5, 1940 |